(No Model.)

E. A. WRIGHT.
COMBINED PLOW AND PLANTER.

No. 257,804. Patented May 9, 1882.

Attest.
Sidney P. Hollingsworth
Newton Wyckoff

Inventor.
E. A. Wright
By his Atty
Philip T. Dodge

UNITED STATES PATENT OFFICE.

EDGAR A. WRIGHT, OF MOLINE, ILLINOIS.

COMBINED PLOW AND PLANTER.

SPECIFICATION forming part of Letters Patent No. 257,804, dated May 9, 1882.

Application filed January 31, 1882. (No model.)

*To all whom it may concern:*

Be it known that I, EDGAR A. WRIGHT, of Moline, in the county of Rock Island and State of Illinois, have invented certain Improvements in Combined Plow and Planter, of which the following is a specification.

This invention relates to that class of plows commonly known in the art as "lister-plows," wherein a double-mold-board plow is combined with a subsoiling device and devices for depositing seed.

The object of the invention is more particularly to construct the listing and seeding devices in such manner that they may be readily applied upon the frame and beam of ordinary sulky-plows now in common use.

To this end the invention consists in the construction of a frame to support the seed and operating devices; in the peculiar manner whereby it is adapted for attachment to the beam of the ordinary plow; in a means for actuating the seed devices, consisting of a series of revolving arms, or a wheel provided with arms adapted to engage with and be driven by the spokes of the main ground-wheels; and in the peculiar construction of the subsoiling device with a downwardly and backwardly inclined standard, whereby the accumulation of obstructions thereon is prevented.

Figure 1:
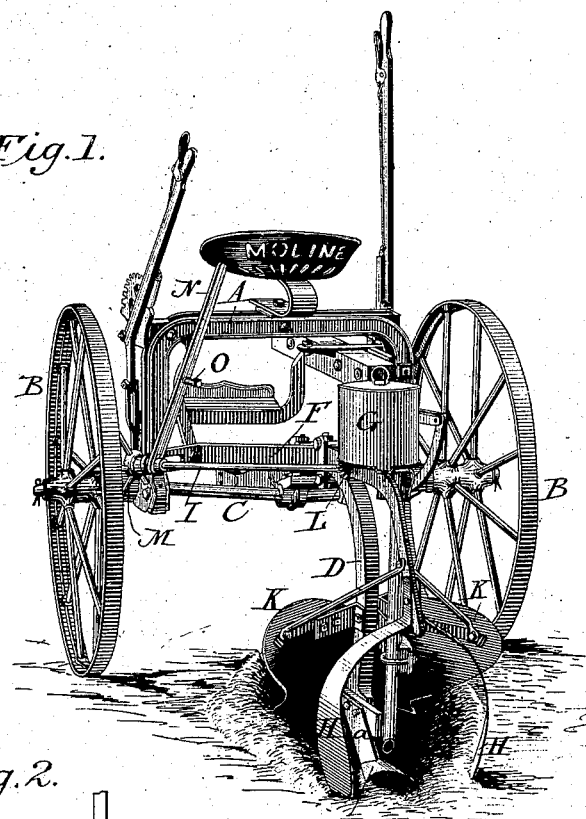
Figure 2:
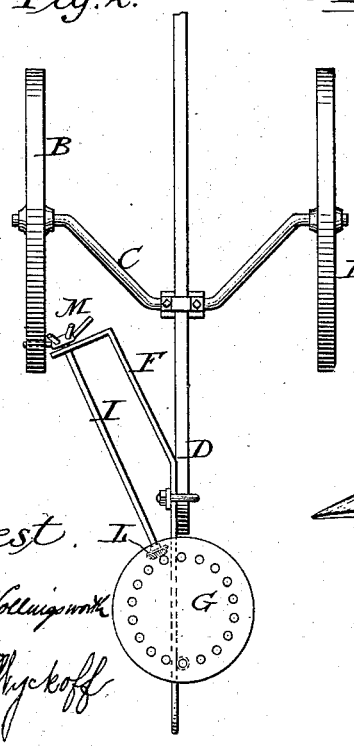
Figure 4:
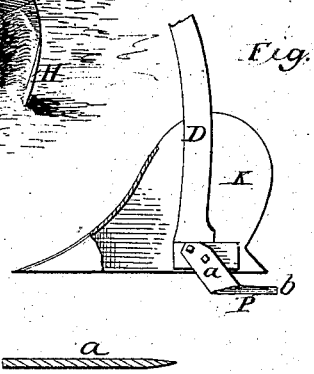
Figure 3:
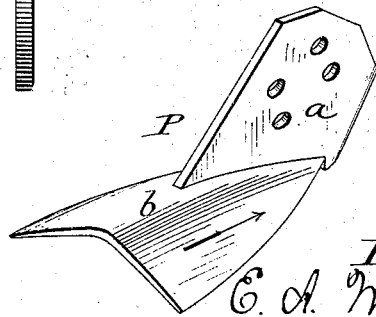

Referring to the accompanying drawings, Figure 1 represents a perspective view of my listing-plow complete and in an operative position; Fig. 2, a top plan view, showing more particularly the form of the frame by which the seeding devices are sustained; Fig. 3, a perspective view of the subsoiling device. Fig. 4 is a side elevation of the mold-board and subsoiler, a portion of the frame being broken away.

Referring to the drawings, A represents an arched axle sustained at its ends by the two ground-wheels B B. The axle is provided, as usual, with a driver's seat, devices for adjusting the ground-wheels, a draft-tongue, and a vertically-swinging bail or crank-frame, C, to which latter is coupled the curved plow-beam D, carrying the double mold-board K. The above parts are all constructed and arranged to operate in the ordinary manner, so that the attendant riding upon the machine may raise and lower the plow-beams by means of the hand-levers. As these features constitute no part of my invention and are well known to those familiar with the art and may be modified to any extent desired, it is considered unnecessary to describe them more in detail herein.

In proceeding to construct my attachment, I first provide an angular frame, F, which may consist, as shown, of a single flat bar of metal bent into such form that it may readily be bolted to the side of the plow-beam D, at its rear end, and that when thus attached it will extend both forward and backward, affording a support for the seed-box and dropping devices G, a support for the two covering-blades H, and a support for the two ends of the horizontal shaft I.

The seed-box G and the seed-dropping devices, which may be of any suitable construction, are located upon the rear end of the supplemental frame F, immediately above and in rear of the main mold-board K. In the drawings I have represented the dropping device consisting of a rotary perforated plate provided on its under side with gear-teeth and actuated by a pinion, L, which is mounted upon one end of the shaft I. The forward end of the shaft extends through a horizontal slot in the supplemental supporting-frame F, and is provided with a series of radial arms or fingers, M, constructed and arranged in such manner as to be actuated successively by the spokes of one of the main wheels B, as clearly represented in Figs. 1 and 2. It will be seen that under this arrangement the rotation of the wheel B causes its spokes to turn the arms M, and thereby transmit a positive and steady motion through the shaft I and its pinion to the seed-dropping disk.

The seeding devices may be thrown out of action by moving the forward end of the shaft horizontally in the slotted frame so as to disengage the arm M from the spokes of the wheel. This may be accomplished by means of any suitable device; but it is preferred, as shown in the drawings, to attach to the frame a supplemental hand-lever, N, the lower end of which engages with the shaft I, while its upper end stands in suitable position to be conveniently reached by the driver. The lever N may be secured in position by means of a spiral friction-spring, O, applied around its pivot, as shown in the drawings, or in any other suitable manner.

The essence of the invention, as regards the devices for operating the seeder, consists in the employment of rotary arms or equivalent devices to engage with and be driven by the spokes of the main wheel, and it is manifest that any suitable connection may be used between this device and the dropping devices. It is preferred, however, to employ a shaft arranged as shown, for the reason that a positive motion is thereby imparted to the seeding devices, and also because a rising-and-falling motion of the plow-beam and the parts supported thereon has no material effect upon the driving devices, as is the case when belts or driving-chains are employed to transmit motion to this class of machines.

To the lower end of the beam D, behind and below the mold-board K, I attach the subsoiling device P, the construction of which is clearly represented in Figs. 1 and 3, the device consisting of a downwardly and backwardly inclined blade or shank, $a$, sharpened on the front edge, and provided at the lower end with a horizontal, or substantially horizontal, plate, $b$, of a ∧ shape, having its edges sharpened and made somewhat concave on the under side. By giving the shank or standard the backward inclination, as shown, weeds, stalks, and other obstructions encountering the front edge of the standard will be forced downward thereunder and permitted to escape, instead of accumulating against the front and impairing the operation of the device, as frequently happens when they are constructed in the ordinary manner.

The essential feature of the subsoiling device is the downward and backward inclination of its standard, the front or cutting edge of the standard being forward of the horizontal portion $b$. The base or horizontal portion may be modified to some extent without affecting its operation. The best results are secured when the standard is carried downward in front of and below the under side of the horizontal portion or foot, as represented in the drawings.

My device for transmitting motion from the spokes of the driving-wheel is peculiarly advantageous because of its extreme simplicity and cheapness, and its applicability to existing machines without change or alteration therein, and because, unlike gear-wheels, the spokes are not disabled or affected by the dirt and mud to which they are liable to be subjected in use in the field.

Having thus described my invention, what I claim is—

1. In combination with a spoked driving-wheel, a seeder-operating wheel provided with a series of arms engaging with and driven by the spokes, as described and shown.

2. The combination of the main frame, its sustaining-wheels, the plow-beam, the supplemental frame attached to the plow-beam, the seeding device, and the shaft extending from the seeding device and provided with arms engaging with and driven by the spokes of the ground-wheel, substantially as shown.

3. In combination with a main frame and sustaining-wheels, one of which is provided with spokes, a seeding device having an actuating-wheel provided with arms, substantially as described, to engage with and be driven by the spokes.

4. The improved attachment for transmitting motion from the ground-wheel of a wheeled machine, consisting of the supplemental frame or support, provided with a wheel constructed substantially as described and shown, whereby it is adapted to engage with and receive motion from the spokes of the ground-wheel.

5. The seeding attachment for wheeled plows, consisting of a supplemental frame adapted, substantially as described and shown, to be carried wholly by the plow-beam, said supplemental frame being provided with seeding devices, and with driving-gear for imparting motion thereto, substantially as shown.

6. In combination with the wheeled main frame and plow, the supplemental frame attached to the plow-beam, the seeding devices upon the supplemental frame, and the driving-shaft provided with arms engaging with the ground-wheel spokes, as described and shown.

7. The angular supplemental frame F, in combination with the seed-discharging devices and the shaft for imparting motion to said devices, both mounted upon said supplemental frame, and the actuating-arms M upon the forward end of said shaft, substantially as shown, the whole constituting a seeding attachment for wheeled plows.

8. The subsoiling device consisting of the base-piece and its standard, having a downward and backward inclination, substantially as described and shown.

9. In combination with the base-piece, the share or standard extending upward and forward therefrom, with the cutting-edge at its front.

10. In a subsoiling device, the base-piece, and the standard extending downward and backward therefrom, the standard being carried below and in front of the front end of the base, substantially as described and shown.

EDGAR A. WRIGHT.

Witnesses:
J. W. WARR,
J. B. WHEELOCK.